United States Patent

[11] 3,586,434

[72] Inventor Peter F. Mueller
 Concord, Mass.
[21] Appl. No. 795,879
[22] Filed Feb. 3, 1969
[45] Patented June 22, 1971
[73] Assignee Technical Operations, Incorporated
 Burlington, Mass.
 Continuation of application Ser. No.
 564,340, July 11, 1966, now abandoned.

[54] SPECTRAL ZONAL PHOTOGRAPHY USING
 COLOR-CODED PHOTOSTORAGE IN A COLOR
 BLIND PANCHROMATIC STORAGE MEDIUM
 32 Claims, 17 Drawing Figs.

[50] Field of Search............................................ 355/2, 32,
 33, 71; 350/162, 164; 352/45; 340/173
[52] U.S. Cl....................................................... 355/2,
 340/173, 350/162, 350/164, 352/45, 355/71
[51] Int. Cl........................................................G03b 27/32

[56] References Cited
 UNITED STATES PATENTS
3,314,052 4/1967 Lohmann..................... 350/162 X Primary Examiner—Samuel S. Matthews
Assistant Examiner—Richard A. Wintercorn
Attorneys—Rosen and Steinhilper and John H. Coult ABSTRACT: This invention relates to spectral zonal photography in which spectral zones of a scene are stored with unique respective carrier modulations on a colorblind photostorage medium such as a black-and-white panchromatic film from which the scene can be reconstructed in color by Fourier transform techniques with spatial and spectral filtering, and in particular to methods and means to effect such storage without the intervention of a plurality of separate individual images of the scene. Each of several spectral zones is modulated with a periodic function, such as a grating having a unique orientation relative to the scene. Embodiments are disclosed in which these zones and their respective modulations can be stored in sequence or simultaneously. Unique spectral zonal filters are disclosed for simultaneous storage of several spectral zones of a scene. In one aspect of the invention such filters can be employed in direct contact with the storage medium. In another embodiment, Fourier transform techniques are employed with spatial and spectral filtering to effect simultaneous storage of several spectral zones of a scene. In all embodiments the final storage of color-coded information in a colorblind storage medium is useful to reconstruct the original scene in the original colors or in any desired portion or portions of the visible spectrum by means of Fourier transform and filtering techniques. The reconstructed scene can be viewed in full color or recorded on a color sensitive medium.

3,586,434

Peter F. Mueller
Inventor
by
Attorney $$I_B(\underline{x}) \cdot P(x)\Big|_\alpha + I_G(\underline{x}) \cdot P(x)\Big|_{\alpha+\frac{\pi}{3}} + I_R(\underline{x}) \cdot P(x)\Big|_{\alpha+\frac{2\pi}{3}}$$

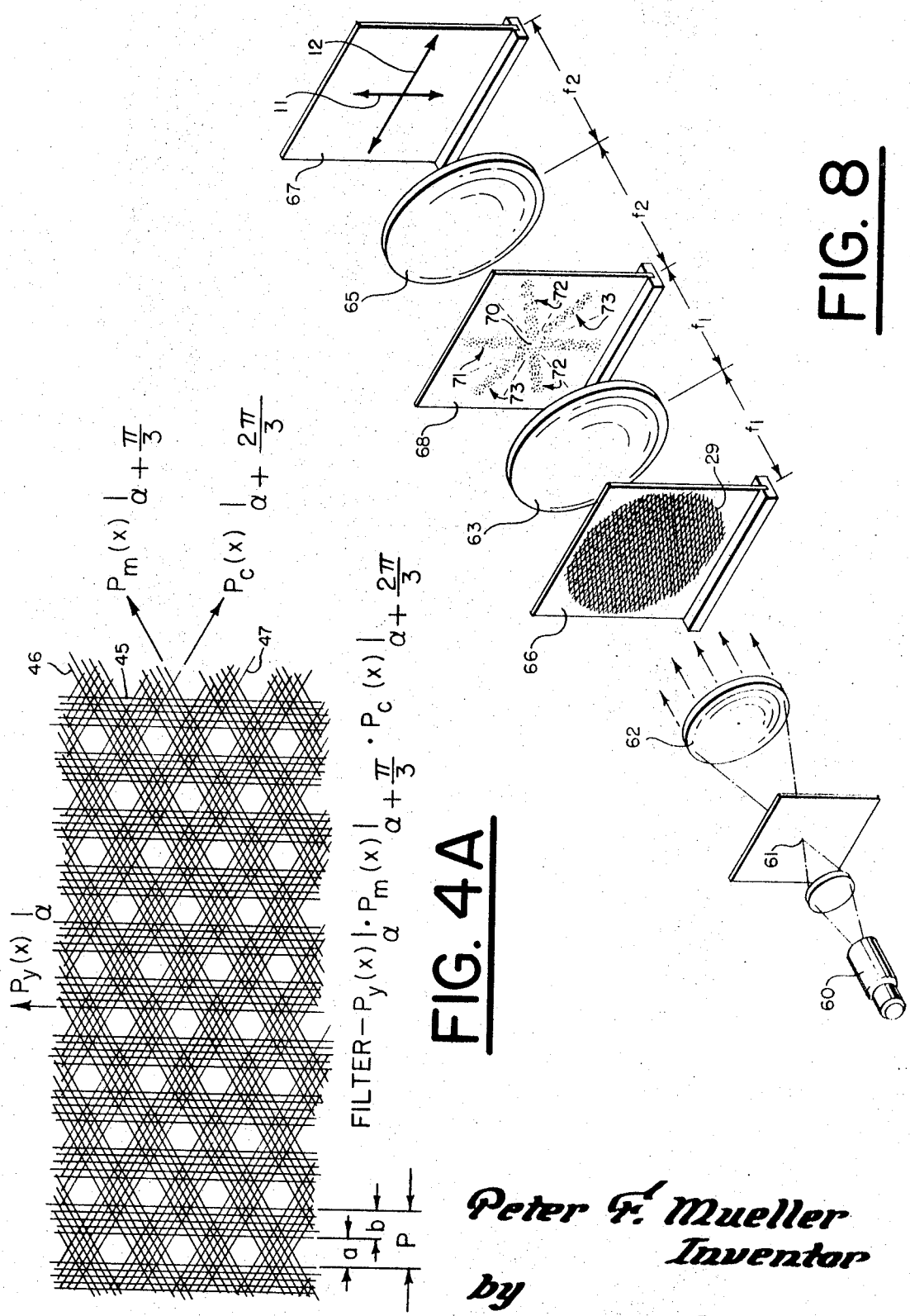

$\mu_0 = f_2 \bar{\lambda} \omega_0$

Peter F. Mueller
Inventor
by
Attorney

PETER F. MUELLER
INVENTOR.

Peter F. Mueller
*Inventor*
by
*Attorney*

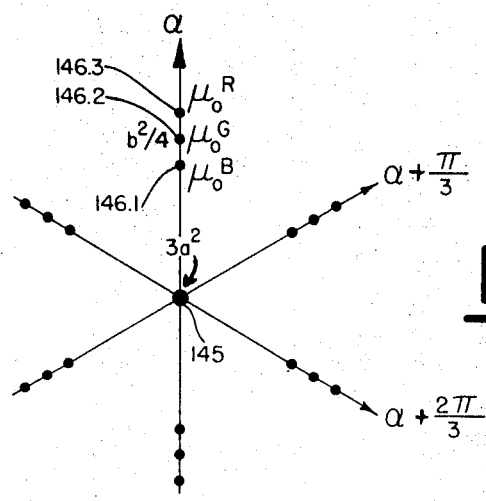

$$\mu_o{}^R = \overline{\lambda}_R f \omega_o$$
$$\mu_o{}^G = \overline{\lambda}_G f \omega_o$$
$$\mu_o{}^B = \overline{\lambda}_B f \omega_o$$

FIG. 11A $\widetilde{\pi}(\underline{\mu})$

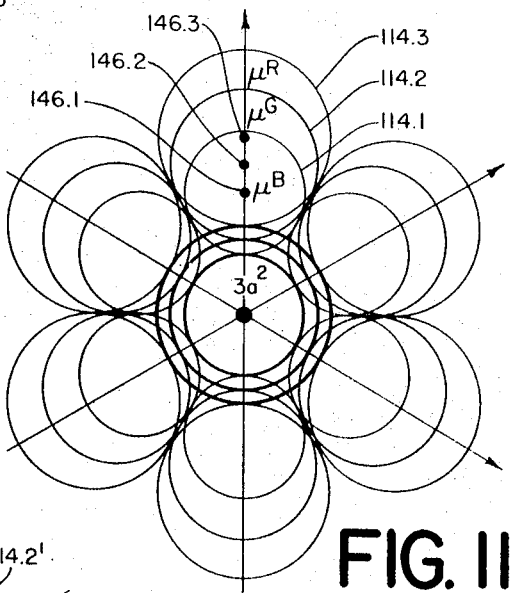

FIG. 11B $\widetilde{\pi}(\underline{\mu}) * \widehat{\widetilde{I}}(\underline{\mu})$

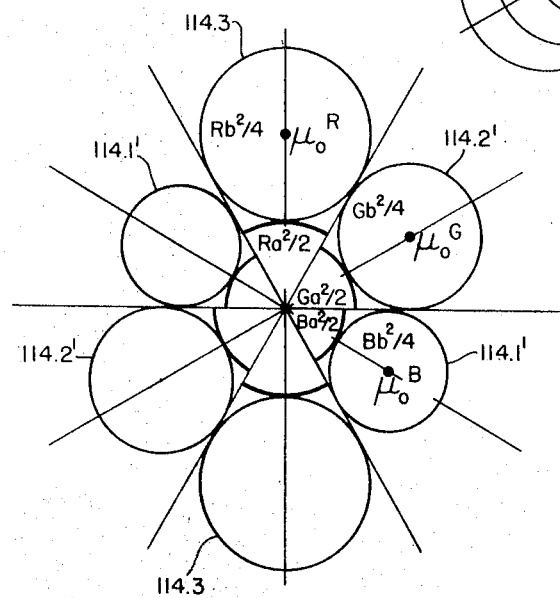

FIG. 11C $S(\underline{\mu}, \lambda)\left[\widetilde{\pi}(\underline{\mu}) * \widetilde{I}(\underline{\mu})\right]$ Peter F. Mueller
Inventor
by
Attorney

SPECTRAL ZONAL PHOTOGRAPHY USING COLOR-CODED PHOTOSTORAGE IN A COLOR BLIND PANCHROMATIC STORAGE MEDIUM

CROSS-REFERENCE TO RELATED APPLICATION

This application is a continuation of application Ser. No. 564,340 filed on July 11, 1966.

BACKGROUND OF THE INVENTION

The production of a true-colored image of a color scene has engaged workers in the photographic arts almost since the beginnings of practical photography. Early attempts proceeded along one path seeking a recording material which would produce the colored image directly, and along another path seeking to produce a record in colorblind (e.g.: black-and-white) recording material, from which a true-colored image of the scene could then be produced. In the approximately three-quarters of a century that has elapsed since first records of these attempts appeared, success in making color-sensitive recording material has been achieved to the point of availability to the general public, but complex technical problems have confined to the laboratory and to industrial usages processes which provide a colored image through the medium of colorblind records of color values of the original scene. Outstanding of these problems has been the need to make a separate record for each of the primary colors (usually three) from which the colored image is synthesized, with the attendant problem of registering the separate records in the colored image.

The problem of making the separate records was also attacked with physical as well as chemical techniques. An early example of the use of diffraction gratings to "code" three primary color values of a scene is described in the British Journal of Photography, Aug. 3, 1906, pages 609—612 by Herbert E. Ives "Improvements in the Diffraction Process of Color Photography." The background process of Prof. R. W. Wood (1899) using three gratings of different periodicities, is described in Wood's U.S. Pat. No. 755,983. Neither Wood nor Ives succeeded in avoiding the need to make a plurality of separate color records; their grating configurations were complex and could not be made on one plate; attempts to do so led to even more complex gratings crossed with Joly lines; and the reproduction apparatus did not pass very much light to the eye.

Carlo Bocca's U.S. Pat. No. 2,050,417 discloses a process employing diffraction gratings to encode color information on black and white storage media in a manner which makes possible improved illumination in the reproduction of the colored image. But, as do Wood and Ives, Bocca begins with three separate images of the original scene (i.e.: "three partial negatives of the subject—first taken through three colored filters"), and fails to avoid the attendant registration problem.

OBJECTS OF THE INVENTION

It is a principal object of the present invention to provide methods and means to record, overlapping each other in a self-registered configuration on the same area of a black-and-white or other monochromatic photostorage medium, a plurality of color-coded images of a single scene, without the need for making two or more separate or partial records of the scene, each image being uniquely so modulated with color-coded information that it can be spatially separated from the others by Fourier transform techniques.

A further object of the invention is to provide methods and means so to encode color information on a black-and-white storage medium in an ordinary camera, in the same way that an ordinary photograph or snapshot is taken, so that the invention may be made available to the general public.

Additional objects of the invention are to provide a storage technique, and means to carry it out, by which the color information will be of enhanced purity, and "cross-products" of two or more separate color values will be minimized; and to provide improved reproduction of color images of the original scene.

These and other objects and features of the invention will become readily apparent from the following description of several embodiments. This description refers to the accompanying drawings, wherein:

FIG. 1 illustrates the steps of a process for sequentially storing spectral zonal information for three separate zones with unique periodic intensity modulations in a single black-and-white storage medium;

FIG. 2 schematically illustrates the separate spectral zonal images stored by the individual steps of FIG. 1;

FIG. 3 schematically illustrates the final storage of three spectral zonal images obtained with the process of FIG. 1;

FIG. 4A illustrates a spectral zonal filter of the subtractive or negative type suitable for simultaneous storage of three spectral zones of a scene with unique periodic modulations in a black-and-white or other "color-blind" but panchromatic storage medium;

FIG. 8 illustrates a system for reconstructing color images by means of a Fourier transform of the stored record and spatial and spectral filtering, along the general lines suggested by Bocca's Pat. No. 2,050,417;

FIG. 11 is a set of detail sketches illustrating the process of color-coding used in the systems of FIGS. 9A and 9B.

For the purposes of the present disclosure, the basic equation for a color scene may be described as:

$$I_w(\underline{x}, \lambda) = I_{\bar{\lambda}_1}(\underline{x}) + I_{\bar{\lambda}_2}(\underline{x}) + \dots - I_{\bar{\lambda}_n}(\underline{x})$$

(Relation 1)

Where:

$I_w(\underline{x}, \lambda)$ represents the intensity distribution of light over the scene as a function of spatial coordinates $(\underline{x})$ and wavelength $(\lambda)$; and $I_{\bar{\lambda}_i}(\underline{x})$ represents the intensity distribution in the wavelength band $\bar{\lambda}_i$ as a function of spatial coordinates $(\underline{x})$; and $\bar{\lambda}_i$ is the average wave length in the band from $\bar{\lambda}_i - \Delta\lambda_i$ to $\bar{\lambda}_i + \Delta\lambda_i$.

This basic equation describes the energy distribution in the image plane of a camera. When the color components are blue, green and red, the energy distribution is the sum of three components at each point in the scene.

In the final storage of color-coded information in a colorblind (e.g.: black-and-white) recording from which the original color scene can be reconstructed, one would like the storage to be according to the following equation:

$$I_w(\underline{x}, \lambda) \cdot H(\underline{x}, \lambda) = I_{\bar{\lambda}_1}(\underline{x}) \cdot P(\underline{x})|_{\alpha_1} + I_{\bar{\lambda}_2}(\underline{x}) \cdot P(\underline{x})|_{\alpha_2} + \dots - I_{\bar{\lambda}_n}(\underline{x}) \cdot P(\underline{x})|_{\alpha_n}$$

(Relation 2)

Where:

$I_w(x,\lambda)\cdot\pi(x,\lambda)$ represents the intensity distribution $I_w(x,\lambda)$ multiplied by the total periodic modulation ($\pi$) of the periodic modulations on all wavelength bands as a function of spatial coordinates ($x$) in the scene and wavelength ($\lambda$); and $$I_{\lambda_i}(\underline{x})\cdot P(\underline{x})|_{\alpha_i}$$

represents the intensity distribution in the wavelength band $\lambda_i$ as a function of spatial coordinates ($x$) multiplied by the periodic modulation ($P$) of the light in that band as a function of spatial coordinates ($x$) with the azimuthal characteristic $\alpha_i$.

It will be understood that the wavelength bands can be blue, green and red, and the periodic modulations can be given azimuthal characteristic oriented at angles $\alpha$, $\alpha+\pi/3$ and $\alpha+2\pi/3$, respectively, as one fairly obvious example, in which case Relation 2 would take the form:

$$I_w(\underline{x},\lambda)\cdot\Pi(\underline{x},\lambda)=I_B(\underline{x})\cdot P(\underline{x})|_\alpha$$
$$+I_G(\underline{x})\cdot P(\underline{x})|_{\alpha+\frac{\pi}{3}}+I_R(\underline{x})\cdot P(\underline{x})|_{\alpha+\frac{2\pi}{3}}$$

(Relation 2A)

Figure 1:
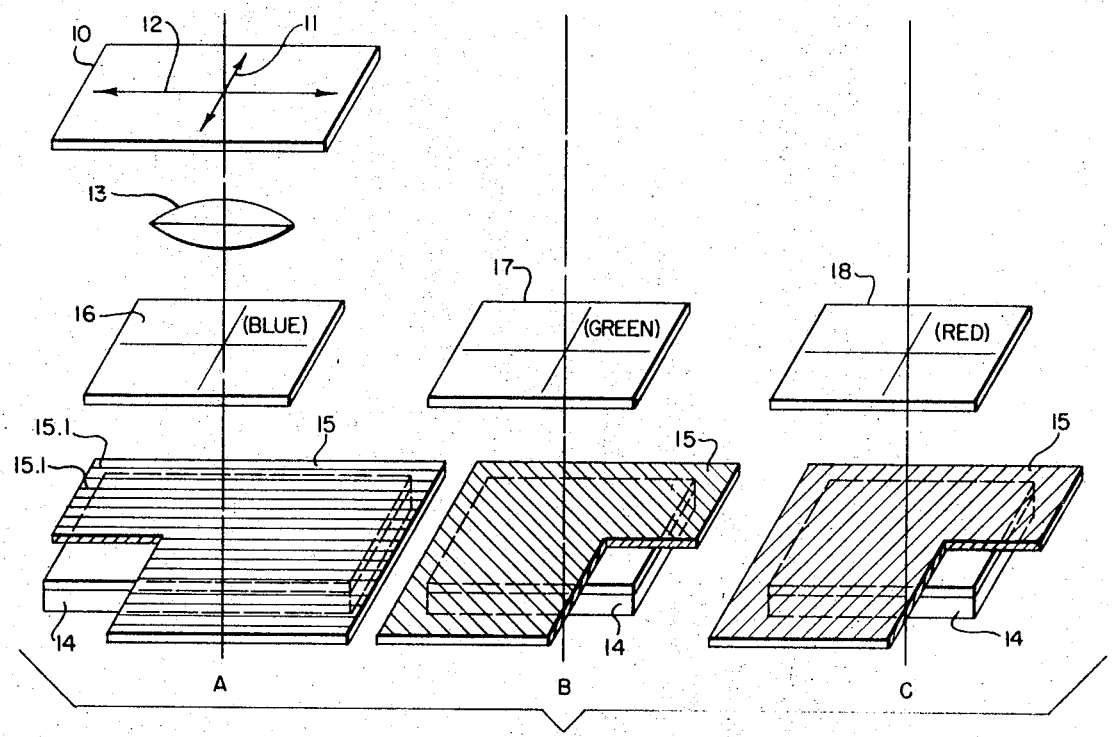
Figure 2:
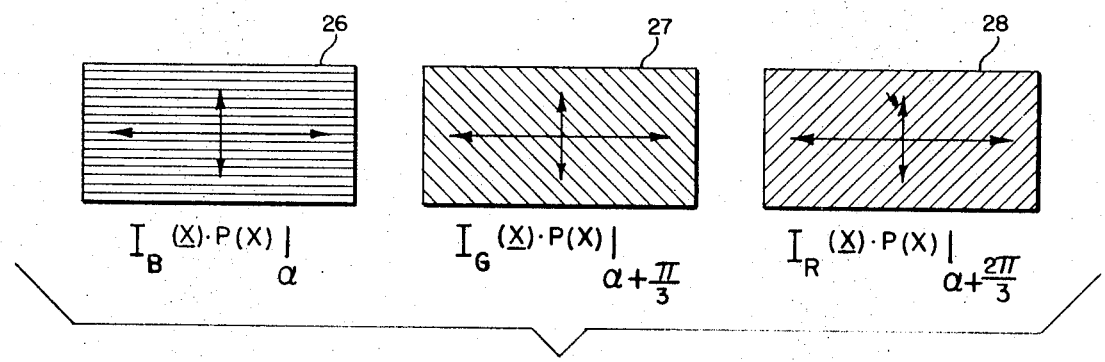

Referring to FIGS. 1 and 2, an object 10, which for the sake of illustration may be a photographic color transparency in which there is a two-dimensional image represented by the double-headed arrows 11 and 12, is imaged by optical means represented by lens 13 onto a colorblind photostorage material 14, a suitable example of which is panchromatic black and white photographic film, preferably of the high contrast and high resolution variety. The object 10, optics 13 and photostorage material 14 remain fixed relative to one another throughout the process about to be described. The source of light (not shown) may be any available white light, such as daylight.

As shown in FIG. 1A, a blue filter 16 is interposed between the object 10 and photostorage material 14, and a diffraction grating 15 is interposed between the filter and the photostorage material, for example, directly on the photostorage material. The diffraction grating may be any suitable grating of periodic opaque and transparent regions, for example, in the configuration of a Ronchi ruling having opaque lines 15.1 on a transparent support. The showing in FIG. 1 is exemplary only and does not represent any particular form of grating.

The grating can be placed at various locations between the object 10 and the photostorage material 14 as long as the grating and the object are imaged as a product in the photostorage; that is, the object 10 and the grating 15 should be optically multiplied in the photostorage material 14, and not merely added therein. This can be done, for example, by placing the grating directly in contact with the photostorage material 14. The image which is recorded by incoherent illumination through the blue filter 16 will then be the product of the intensity due to blue light as a function of the coordinates ($x$) in the recorded image and, in the present illustration, the periodic variation of the grating 15 in a single dimension ($x$) oriented in a prescribed azimuthal direction ($\alpha$), as indicated at 26 in FIG. 2 immediately beneath FIG. 1A.

FIG. 1B is identical to FIG. 1A except that a green filter 17 has been substituted for the blue filter and the grating 15 has been rotated in azimuth 60° ($\pi/3$) about the axis of the system. Another exposure of the object 10 is then made, which records another image in the photostorage material 14 as shown at 27 in FIG. 2, immediately below FIG. 1B. This image is mathematically described as the product of intensity due to exposure of the object through the green filter 17 as a function of the spatial coordinates ($x$) and the periodic function of the grating in a single dimension ($x$) oriented in the azimuthal direction $\alpha+\pi/3$. A third exposure is then made as illustrated at FIG. 1C through a red filter 18 with the grating 15 rotated a further 60 ($2\pi/3$) degrees to place on the photostorage material 14 a third image illustrated at 28 in FIG. 2 immediately below FIG. 1C, which is mathematically described as the product of the intensity of the exposure of the object 10 through the red filter 18 as a function of spatial coordinates ($x$) and the periodic variation of the grating in a single dimension ($x$) oriented in the azimuthal direction $\alpha+2\pi/3$.

Figure 3:
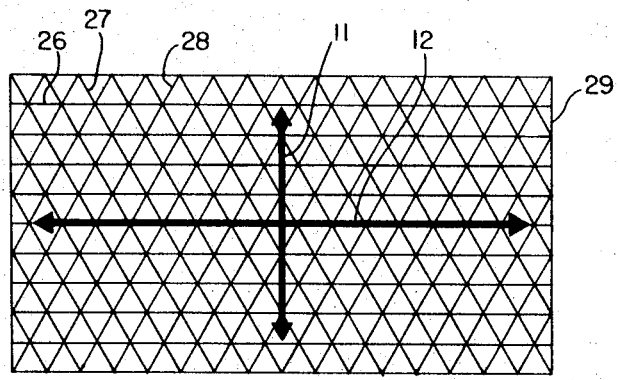

These three exposures are added in the final black-and-white storage 29, which is schematically illustrated in FIG. 3, where the double-headed arrows 11 and 12 representing the original object have been reproduced and the grating images 26, 27 and 28 are superposed in the same recording area. The mathematical sum of the three products shown in FIG. 2 is set out under FIG. 3. This is the final storage of color-coded information in the colorblind (black-and-white) image, according to relation 2, from which the original color scene can be reconstructed by Fourier transform techniques and spatial and spectral filtering. The stored image 29 is desirably a transparency.

The system illustrated in FIG. 1 has the virtue not heretofore available that the scene being photographed, the recording medium on which it is being photographed, and the optical elements which focus the image of the scene on the recording medium, all remain fixed relative to each other throughout the entire process of recording the coded images representative of the color bands into which the scene is broken down. Thus, since separate color coded images are not made on separate pieces of recording media, the problem of registering such images is eliminated. The final color-coded black-and-white record shown in FIG. 3 is obtained directly, without the intervention of the separate records of elemental color-coded images. The three diapositives mentioned in Bocca Pat. No. 2,050,417, for example, are eliminated completely.

Figure 4B:
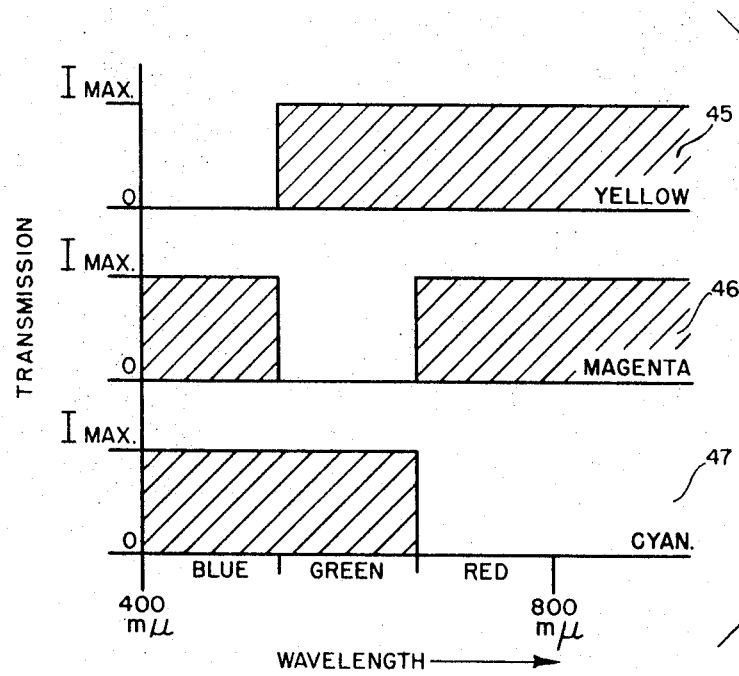
FIG. 4B is a graph illustrating the ideal transmissivities of the filter elements of FIG. 4A.

FIG. 4A illustrates a "negative" color filter consisting of the superposition of three colored Ronchi rulings having respective unique azimuthal characteristics, e.g: rotated in $\pi/3$ increments from one another. FIG. 4B shows ideally the required spectral transmissions of the respective rulings. A first array of bars 45 of width "$b$" in FIG. 4A represent yellow bars, with transparent bars of width "$a$" intervening; these comprise a yellow Ronchi ruling having periodicity $P(x)$, which generally is represented mathematically by $$P_y(x)\alpha_y.$$

Similarly, a magenta ruling 46 is generally represented by $$P_m(x)\alpha_m;$$

and a cyan ruling 47 is generally represented by $$P_c(x)\alpha_c.$$

In each of these rulings the respective transmission spectra in FIG. 4B refer to the absorbing portion of the ruling (the portion that would be opaque in a ruling consisting of opaque bars or lines separated by transparent bars or lines), while the intervening portions are preferably transparent passing all visible wavelengths substantially unattenuated.

The three rulings are superposed, so that they are multiplied each with the others, and the product of their respective modulations as a function of spatial coordinates ($x$) and wavelength $\lambda$ is:

$$\pi(\underline{x},\lambda)=P_Y(\underline{x})|_{\alpha_Y}\cdot P_m(\underline{x})|_{\alpha_m}\cdot P_c(\underline{x})|_{\alpha_c}$$

(Relation 3)

Where:

$\pi(x,)$ represents the product of the periodic yellow, magenta and cyan modulations as a function of spatial coordinates ($x$) and wavelength ($\lambda$).

FIG 4A shows a special case of Relation 3. At a first glance, it might not appear that multiplication of Relation 1 with Relation 3 would yield relation 2. For example, the blue term in relation 2 would appear to come out:

$$\pi(\underline{x})\cdot\lambda\cdot I_B(\underline{x})=I_B(\underline{x})\cdot P_Y(\underline{x})|_{\alpha_Y}P_m(\underline{x})|_{\alpha_m}P_c(\underline{x})|_{\alpha_c}$$

When it is realized, however, that the magenta and cyan filters each transmit blue, and that the blue light does not "see"

these filters, it is apparent that the terms involving $P_m$ and $P_c$, should not appear in practice. Ideally, the transmittance of blue through magenta and cyan filters is unity, in the sense that the magenta and cyan filters are not a function of the spatial coordinates $(x)$ for blue; thus, the terms $P_m$ and $P_c$ are constants with relation to $(x)$, and have a value of unity for an ideal dye, so that, for practical purposes we can set:

$$\pi(\underline{x}) \cdot \lambda \cdot I_B(\underline{x}) = I_B(\underline{x}) \cdot P_Y(\underline{x})|_{\alpha_Y}$$

(Relation 4)

That is, the blue light is modulated, essentially, only by the yellow filter.

Similarly: $\pi(\underline{x} \cdot \lambda) \cdot I_G(\underline{x}) = I_G(\underline{x}) \cdot P_m(\underline{x})|_{\alpha_m}$ (Relation 5)

$$\pi(\underline{x} \cdot \lambda) \cdot I_R(\underline{x}) = I_R(\underline{x}) \cdot P_c(\underline{x})|_{\alpha_c}$$

(Relation 6)

Hence multiplication of the scene (relation 1) with the "negative" filter (relation 3) yields Relation 2 in the form:

$$I_w(\underline{x} \cdot \lambda) \cdot \pi(\underline{x} \cdot \lambda) =$$
$$I_B(\underline{x}) \cdot P_Y(\underline{x})|_{\alpha_Y} + I_G(\underline{x}) \cdot P_m(\underline{x})|_{\alpha_m} + I_R(\underline{x}) \cdot P_c(\underline{x})|_{\alpha_c}$$

(Relation 2B)

The "negative" color filter consists of negative or subtractive color dyes on a background which may be transparent to white light.

Multiplicative filters according to FIG. 4A may be made by the process illustrated in FIG. 1, using any commercially available three-layer color film, of which "Ektachrome" or "Kodacolor" (Eastman Kodak Co.), "Anscochrome" (General Aniline and Film Co.), or "Agfacolor" (Agfa Aktiengesellschaft Leverkusen-Bayerwerk), are representative examples. Ektachrome has been found to be particularly suitable. A filter has been made from it, as is now described.

Ektachrome is constituted of three layers having, respectively, yellow dye (minus blue), magenta dye (minus green) and cyan dye (minus red). Following a scheme according to FIG. 1 using a Ronchi ruling, a piece of this film was exposed through a blue color filter as in FIG. 1A, then through a green color filter as in FIG. 1B, and then through a red color filter as in FIG. 1C. The piece of film thus exposed was developed, not as a reversal film as is ordinarily done, but by the Kodak Color Process C-22, available from Eastman Kodak Company, Rochester, New York, for their negative films "Kodacolor" and "Ektacolor." The use of Process C-22 to produce a negative from Ektachrome is known in the open literature. By this process, the yellow layer produces yellow grating lines in response to the blue light, the magenta layer produces magenta lines in response to the green light, and the cyan layer produces cyan lines in response to the red light. White lines were produced in each layer wherever the Ronchi ruling was black. This process produced exactly the multiplicative filter which is illustrated in FIG. 4A. A similar filter can be made using Anscochrome and developing by Kodak Color Process C-22. Kodacolor and Agfacolor films are also useful, but these have a bright yellow background which may be objectionable.

While the filter of FIG. 4A is illustrated as composed of Ronchi rulings, the gratings need not be limited to this configuration. Filters constructed of any periodic function, from simple harmonic to a square wave, can be used. The spatial frequency ($\omega_o$ in lines/mm.) of each grating used in any embodiment of the invention should be chosen such that $$\omega_o \geq 2\omega_s$$

where $2\omega_s$ is the image spatial bandwidth, in order to prevent color cross-talk and thus desaturation. In a Ronchi ruling, each period ($p=1/\omega_o$) is divided evenly between the opaque bar $(b)$ and the transparent bar $(a)$, so that $a=p/2$.

Grating configurations may be used in which $a \neq p/2$, and in which, in place of square wave functions which bars provide, other functions are used. Ronchi rulings were found convenient in FIG. 4A because of their relative simplicity and because they allow a high degree of light transmission while providing effective color-code modulation.

A "positive" color filter, that is, one contracted of positive colors, can also be made in a multilayer color medium, along the same general lines as the "negative" filter of FIG. 4A, employing three superimposed gratings in the form of Relation 3, but with red, green, and blue substituted for their respective negative colors, and with "black" or opaque spaces between the color lines. However, multiplication of such a "positive" filter with a color scene will approximate an expression like Relation 2 only if the color line ("slit") widths $(a)$ of each grating are very narrow compared to the period length $p$ of the grating.

A suitable relationship is $$10a \leq p.$$

Such a color filter will require resolution, in the black-and-white photostorage medium, on the order of $5\omega_o$ to $10\omega_o$ depending in the spectral purity required, and the speed of the photostorage medium will be effectively reduced by the most severe filter factor (on the order of 10—15 for the blue zone). However, use of this "positive" filter would permit certain freedoms in photostorage, as will be explained below.

Figure 5:
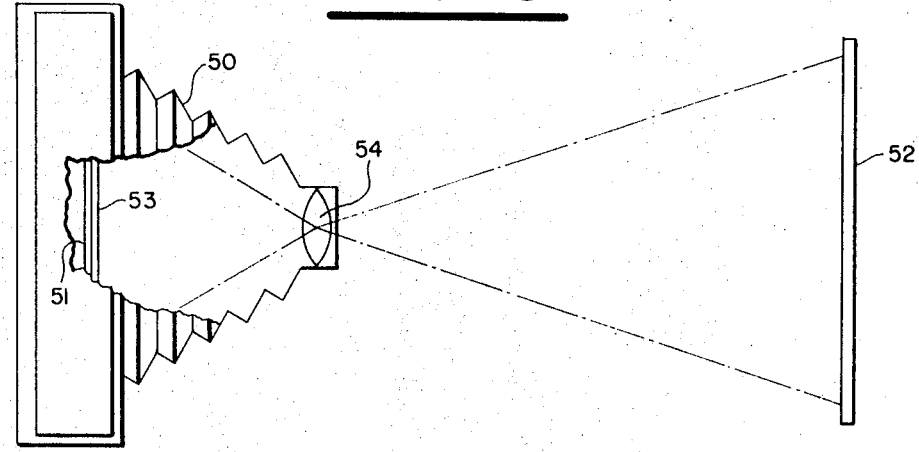
FIG. 5 illustrates the use of the filter of FIG. 4A in an ordinary camera.

The "negative" filter of FIG. 4A, or the corresponding "positive" filter described above, can be multiplied with a scene and the individually modulated color products can be summed in a photostorage medium simply by placing the filter in a camera in contact with a piece of black and white panchromatic film, as is illustrated in FIG. 5. In this illustration a camera 50 is shown having a photographic plate 51 in the film plane of its lens 54, the scene being represented by an object 52. A suitable filter 53 ("negative" according to FIG. 4A or "positive" as described above, for example) is shown in contact with the plate 51. The photographic plate has only one photostorage layer on it. The exposures through the three gratings of the filter are therefore simultaneously added in the photostorage on the plate 51. The resulting final black-and-white storage of color-coded information is thus the sum of products according to Relation 2, and has a configuration substantially as is schematically shown in FIG. 3. It may be a transparency. In this embodiment of the invention, however, the color-coded black-and-white image of the scene is obtained in a single step in an ordinary camera, and can therefore be used by even the unskilled amateur photographer.

The sum of images stored in a configuration according to FIG. 3, whether by serial addition according to FIG. 1, or by simultaneous addition, as illustrated for example in FIG. 5, can be separated by Fourier transform techniques with partially coherent polychromatic light. Bocca Pat. No. 2,050,417 suggests in its FIG. 6 a system for performing the separation, in which the stored black-and-white image is the projection positive located at position A-B-C-D. Bocca illustrates in his FIG. 4 an idealized representation of diffraction orders along the primary axes of diffraction due to the three gratings stored in the projection positive. In practice, however, I have found that, due mainly to nonlinearities in photographic processing of the black-and-white color-coded storage image, this idealized representation is not achieved, but instead, cross-products appear along axes parallel with the primary axes. These cross-products can cause degradation in the reproduction of the original color scene unless steps are taken to minimize their effects. Use of a narrow-line grating, as in the "positive" filter I have described above, or with very wide opaque lines 15.1 in FIG. 1, will minimize the effects of such cross-products in the reproduction. If, for example, the width $(a)$ of transparent lines is such that the relationship $10a \geq p$ is observed, nonlinearities in the photographic processing of the color-coded black-and-white stored image can be ignored, for practical purposes, even though systems according to the invention require the storage of continuous tone, rather than mere binary images. This will, however, be done at the expense of the resolution requirements described above.

Degradation of the reconstructed image due to cross-products in the Fourier transform of the color-coded black-and-white stored image can be reduced to insignificance by processing the black-and-white storage images so that the amplitude transmission in the stored image is linearly proportional to the input intensity (i.e.: exposure) in recording the image. If this is done, the cross-products are eliminated and the separation of color zones in the transform plane is mathematically exact, and the storage film need only resolve the fundamental carrier frequency.

It has been found mathematically that the cross-products can be eliminated by making the amplitude transmission of the object transparency linearly proportional to the input intensity (exposure) by which the exposures were made. To obtain this result requires an analysis of the density-versus-log exposure curve for photographic material. A conventional equation for the intensity transmission of a photographic transparency when exposures are restricted to the straightline portion of the D-log E curve is:

$$T_I(\underline{x}) = KI(\underline{x})^{-\gamma}$$

where $$K = 10^{-Db_t - \gamma}.$$

The amplitude transmission for the transparency can be stated as:

$$T_A(x) = T_I(x) = KI(x)^{-\gamma/2}$$

In these equations:
$T_I(x)$ is the intensity transmission;
$K$ is a constant
$I(x)$ is the intensity distribution of an image formed by uniformly illuminating a transparency;
$\gamma$ is the slope of the density-versus-log exposure curve;
$D_b$ is the base density of the photographic material;
$T_A(x)$ is the amplitude transmission.

The equation for amplitude transmission can be made linear with input intensity transmission by setting gamma equal to −2. It must be recognized, however, that for this to have any valid effect the gamma should also be constant. For example, it becomes important that no image exposure be made in a nonlinear portion of the density-versus-log exposure curve.

In processing the images for a constant gamma of −2, it is necessary to relate this gamma to the coherence of the optical system. Measured density-versur-log exposure curves vary with the conditions of measurement. Thus curves measured with a densitometer, a microdensitometer, and in a coherent system may differ one from the others. These differences are apparently due to differences in diffuse and spectral density which in turn relate to the graininess of the photographic emulsion. For the present invention, the gamma should be determined by measurement in an optical system of the same degree of coherence as is used to reconstruct and display the colored images.

The following two examples illustrate specific methods that have been used in practicing the invention.

EXAMPLE I

Figure 6:
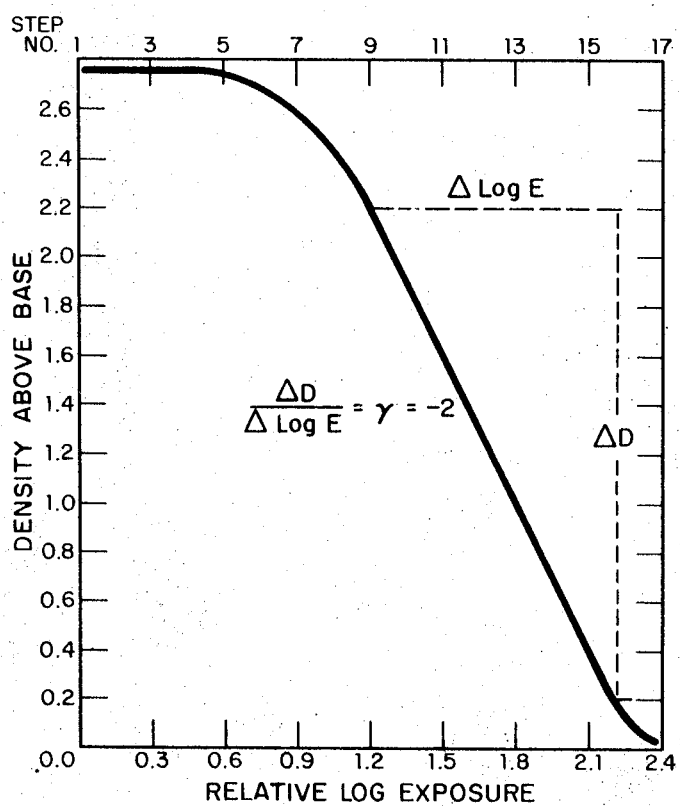
FIG. 6 is a graphical illustration of a density versus log exposure curve for reversal processing of photographic films, useful in explaining a technique which may be employed in practicing the invention.

The photographic plate 51 used in the camera 50 had a reversal process density-versus-log-exposure curve with a gamma of −2 as illustrated in FIG. 6. The plate was uniformly preexposed so that the object exposures fell in the straight portion of the exposure curve. The maximum total exposure was limited so that this also did not go beyond the straight line portion of the curve.

The original colored image was reconstructed and read out in the coherent system of FIG. 8. The displayed image was of true color and good quality with no noticeable ghosting of the cross-product images observable upon close scrutiny.

EXAMPLE II

Figure 7:
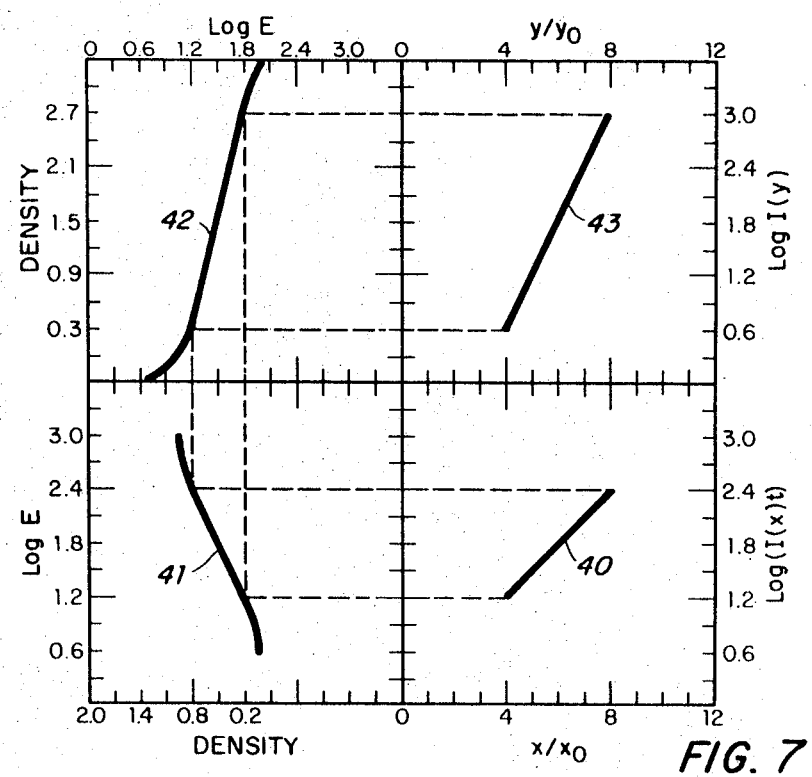
FIG. 7 is a graphical illustration of double negative processing to obtain the results of the reversal processing of FIG. 6.

Exposures were made the same as in Example 1 but using a film 51 processed to a gamma of minus one-half as shown by curve 41 in FIG. 7. Again the film was uniformly preexposed to eliminate the nonlinear toe of the exposure curve and the maximum exposure was also limited so as to remain in the straight line portion of the curve. This film was normally processed and then projection printed onto a high resolution plate having a normal process gamma of 4 as shown in curve 42 of FIG. 7. Again normal processing was used and the result was a transparency as shown in curve 43 having an intensity transmittance equal to the square of the input intensity as represented by curve 40. Thus the output amplitude transmittance is proportional to the input exposure. This transparency was displayed in a coherent system according to FIG. 8 with results similar to those in Example I.

Figure 8A:
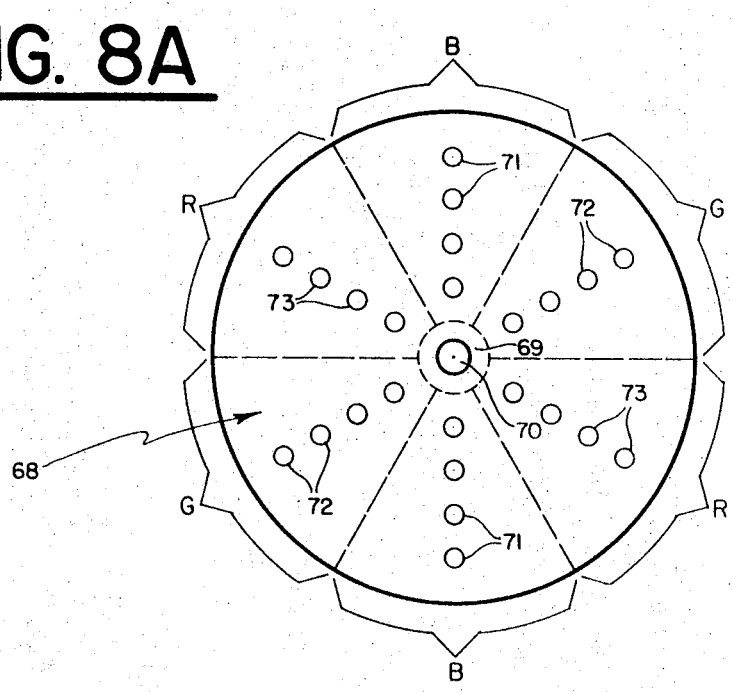
FIG. 8A is a detail sketch illustrating the use of a spatial and spectral filter in FIG. 8.

FIG. 8 illustrates diagrammatically an optical system for reconstructing and viewing or recording colored images that are stored in black-and-white as described above. FIG. 8 illustrates a fairly conventional partially coherent optical system comprising a light source 60, pin hole aperture 61, light collector lens 62, converging (or transform) lenses 63 and 65 separated by the sum of their focal lengths $f_1$ and $f_2$, frame means 66 for supporting the color-coded black-and-white transparency 29 and support means 67 for supporting a photosensitive color medium or a display screen. A color reconstruction filter 68, details of which are shown in FIG. 8A, is located in the back focal plane of the first transform lens 63 and the front focal plane of the second transform lens 65. For simplicity of illustration, only the grating modulation lines at three different angles are shown in the black-and-white stored image 29, but it will be understood that this image is a transparency containing original object information as well as grating information.

For purposes of the invention, light source 60 should be an intense polychromatic light source; an arc lamp will be suitable.

The pin hole aperture 61 is used to increase the coherency of the light and the collector lens 62 following the aperture can provide a light beam of a selected diameter for illuminating the system. With a collimated light beam the distance between the collector lens and the following components of the system becomes noncritical. With an uncollimated light beam magnification can be obtained.

The color reconstruction filter 68 in the back focal plane of the first lens 63 is located in the Fourier transform plane. The light beam from the collecting lens 62 is brought to a point focus at the transform plane. The light from the source 60 must be at least partially coherent at the illumination plane where the stored image 29 supported in frame 66 is illuminated. The required degree of coherence is related to the carrier frequency. Preferably the coherence interval (the distance between two extreme points in a light field which still exhibit interference) should be equal to or greater than a few periods lengths of the carrier frequency.

With the black-and-white color-coded stored image 29 positioned in frame 66, a diffraction pattern will appear in the transform plane. This diffraction pattern is depicted at the location of the color reconstruction filter 68. Light from the source 60 that is undisturbed by the recorded image 29 will be focused to the center of the transform plane as spot illustrated as the central illumination spot 70. This spot represents the zero order of each grating and is commonly called the DC spot. Since this spot is independent of grating orientation it will be common to all of the individual color-band images superimposed in the stored image 29. A first series of spots 71 (shown vertically oriented in FIG. 8) represents diffraction orders of the horizontal grating related, for example, to the blue exposure in FIG. 1A. Extending out in both directions beyond the zero diffraction order are the first and several higher diffraction orders.

The diffraction orders 72 related for example to the green exposure in FIG. 1B are in a line azimuthally rotated 60° clockwise from the diffraction orders 71, and the diffraction orders 73 related for example to the red exposure of FIG. 1C are in a line rotated azimuthally 60° clockwise from the diffraction orders 72.

FIG. 8 shows only diffraction orders along the primary axes of diffraction. If appropriate steps are taken, as described above, cross-products will not appear along axes parallel with the primary axes.

Figure 8B:
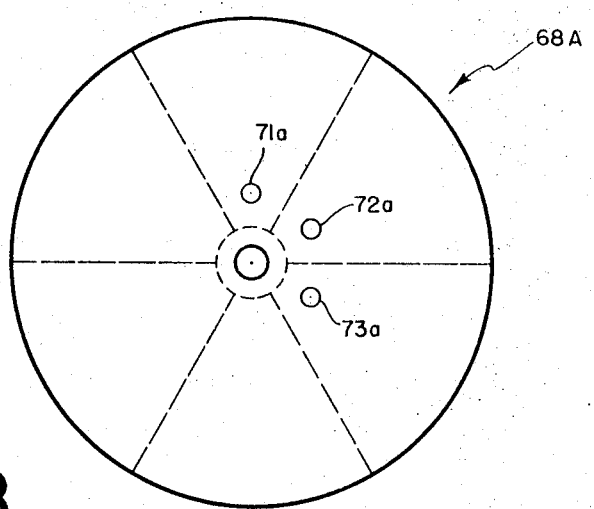
FIG. 8B is a detail sketch illustrating an alternative spectral and spatial filter.

Reconstruction of the original color scene is obtained by placing a color reconstruction filter 68 as illustrated, for example, in FIG. 8A in the transform plane of FIG. 8. The color reconstruction filter is, in this illustration, opaque at the center 69, to block the DC spot 70. Arrayed about the center in diametrically-opposed pairs are six equal sectors of color filter material. A pair of blue filter sectors (B, B) are located in the path of light forming the diffraction orders 71 related to the blue exposure, a pair of green filter sectors are located in the path of light forming the diffraction orders 72 related to the green exposure, and a pair of red filter sectors are located in the path of light forming the diffraction orders 73 related to the red exposure (all referred, for example, to FIG. 1). A reconstruction, in full color, of the original scene 11, 12 appears in the plane of the support means 67, where it can be recorded on color-sensitive photographic film, or observed on a screen. This reconstruction would contain gratinglike images (fringes) since more than one diffraction order is passed on each sector. By passing only one diffraction order through each sector or by destroying temporal coherence between orders from each grating, continuous tone reconstructions may be obtained without the presence of fringes. FIG. 8B shows a spectral and spatial filter 68A which passes one order through aperture 71a in one sector (blue), one order through aperture 72a in a second sector (green), and one order through aperture 73a in the third sector (red). The rest of this filter 68A is opaque.

Figure 9A:
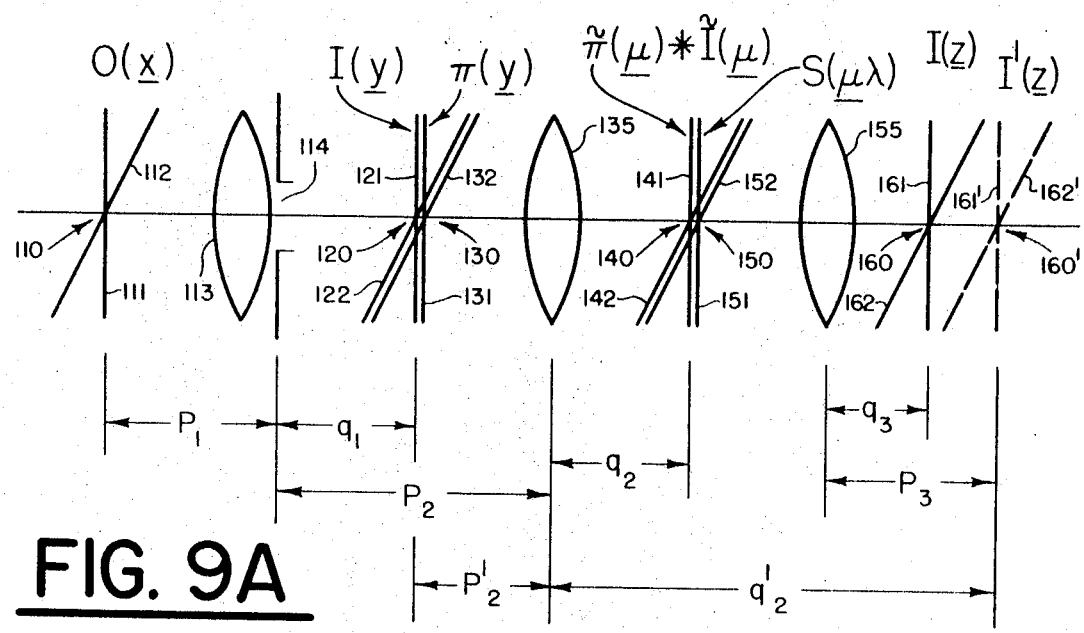
FIGS. 9A and 9B are schematic illustrations of two cameras, similar in principle, for making a multispectral zone image in colorblind storage material by Fourier transform techniques applied to an image of the scene followed by spatial and spectral filtering.

FIG. 9A shows a camera system for multiple-zone recording of spectral information in a color scene. In this figure, the plane of the object 110, corresponding to the object 10 in FIG. 1, is located by a pair of lines 111 and 112 crossing on the axis of the system. An ordinary achromatic camera lens 113, fitted with an adjustable-iris stop 114, focuses an image 120 of the object in an image plane, which is located by a pair of lines 121 and 122 crossing on the system axis. Consistent with notation familiar to workers in the art, the object may be termed $0(x)$, and the image may be termed $I(y)$, where $(x)$ represents the spatial coordinates in the object plane and $(y)$ represents the spatial coordinates in the image plane.

The components thus-far described are those found in a camera. The object plane-to-lens (iris stop) distance is $p_1$ and the lens-to-image plane distance is $q_1$, in accordance with the general relationship:

$$\frac{1}{p} + \frac{1}{q} = \frac{1}{f}; \text{ where}$$

"$f$" is the focal length of the lens involved. In place of the usual film and back, however, the system of FIG. 9A has a special neutral density grating 130 in the image plane. The plane of this grating is located in FIG. 9A by a pair of lines 131 and 132 crossing on the system axis. The special grating 130 has, for the purposes of describing this embodiment, three-gratings in a configuration as shown in FIG. 4A, in which each grating is a one-dimensional black-and-white cosine ruling of spatial frequency $\omega_o$, and has an amplitude transmission represented by:

$P(y) = a + b \cos \omega_o Y$ where:

$P(Y)$ represents the periodic modulation of the grating in one dimension in the image plane, and
$a > b$.

For the three zone system under description the amplitude transmission is:

$\pi(y) = 3a + b \cos \omega_0 y|_{\alpha_1} + b \cos \omega_0 y|_{\alpha_2} + b \cos \omega_0 y|_{\alpha_3}$ (Relation 7)

Relation 7 resembles Relation 3, except that no spectral functions are present in Relation 7.

Following the image plane and special grating 130 is a first transform (converging) lens 135 having focal length $f_2$, located with the image plane in front of it. Assuming the system is illuminated by partially coherent polychromatic light (sunlight for aerial applications; extended tungsten source for laboratory applications), a transform of the special grating 130 convolved with the image 120 will appear in the transform plane 140 in the back of the first transform lens 135. The transform plane may be designated the $(\mu)$ plane, and the image convolved with the grating may be designated $\tilde{\pi}(\mu)*I(\mu)$. Two lines 141 and 142 crossing on the system axis locate the transform plane.

Figure 10:
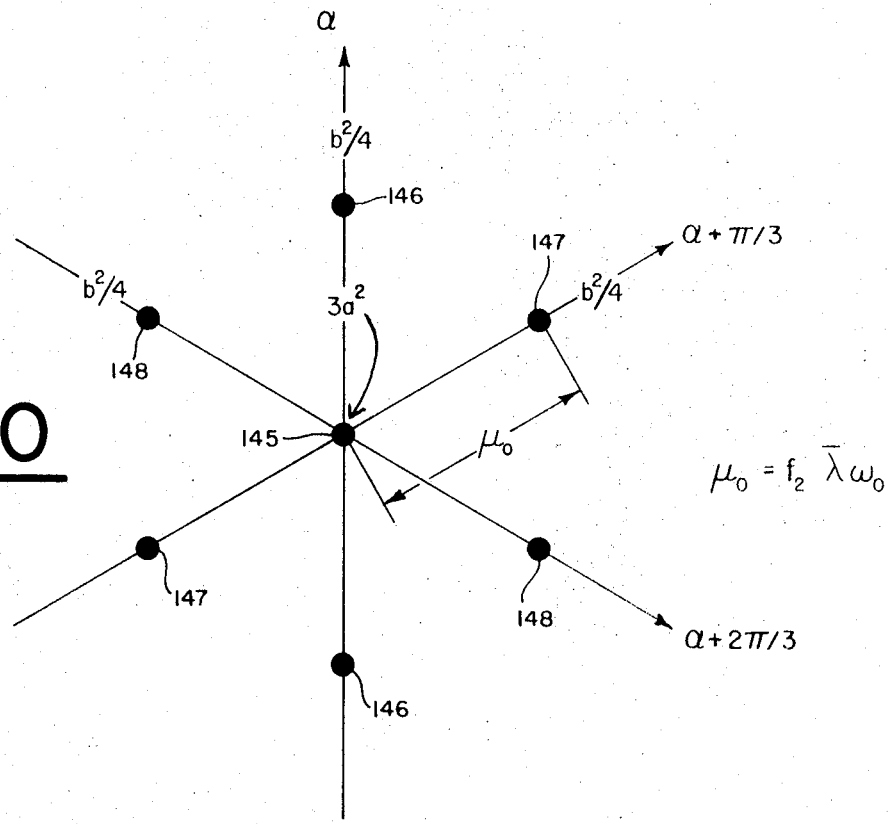
FIG. 10 is a detail sketch illustrating the Fourier transform configuration used in the systems of FIGS. 9A and 9B.

The Fourier transform of the special grating 130, designated $\tilde{\pi}(\mu)$, is represented schematically is FIG. 10, in which the relative intensity distributions in the zero and first orders are shown, but no spectral distribution is indicated. The zero order is represented by a spot 145. The first orders of the grating at $\alpha_1$ are represented by spots 146; those of the grating at $\alpha_2$ by spots 147; and those of the gratings at $\alpha_3$ by spots 148. Since the gratings are all simple harmonic functions (cosine) the grating orders in the transform plane are delta functions, and no orders higher than the first order appear; the spots 146, 147 and 148 represent the delta function positions of $\tilde{\pi}(\mu)$. The term $\mu_o$ in FIG. 10 represents the separation of each first order position from the zero order.

The amplitude distribution of the camera lens exit pupil (i.e. the iris stop (114) distribution) is replicated by the special grating $\pi(y)$ so as to be convolved about each of the delta function positions in the transform plane 140. When the iris 114 is stopped down so that the diameter of the iris image is $\mu_o$ or less, these iris stop replication images become separated in the transform plane. This is shown more clearly, and in greater detail in FIGS. 11A and 11B.

In FIG. 11A the position of each first-order delta function spot in FIG. 10 is taken by a series of smaller dots representing the spectral distribution in the diffraction order. Thus, for example, three small dots 146.1, 146.2 and 146.3 are shown for the grating at $\alpha_1$, representing the centers, respectively, of the blue, green and red bands of the spectrum, spaced $\mu_o$ from the zero order spot 145. The intensity distribution $b^2/4$ for this entire first-order spot 146 is also shown. FIG. 11B shows the convolution of the exit pupil distribution about each delta function. Reference characters have been assigned to exit pupil images 114.1 about dot 146.1, 114.2 about dot 146.2, and 114.3 about dot 146.3, respectively. For the sake of simplicity, and because it is not necessary to do so, additional reference characters have not been assigned in FIGS. 11A and 11B. It is seen, however, that the Fourier transform of the image convolved with the grating contains the color information in the image, partially dispersed.

Spectral band limiting of each of the three zones into which the image is separated by the grating 130 is achieved in the transform plane by introduction of a spectral filter 150, which is located in the transform plane. This filter may be similar in construction to the filter of FIG. 8A, except that it need not stop the zero order. The plane of this filter is located by two lines 151 and 152 crossing on the system axis. This filter is the first element in the system to introduce color information, and it is therefore designated as $S(\mu,\lambda)$, a function of both spatial coordinates in the transform plane and of wavelength. As is indicated in FIG. 11C, this filter is multiplied with the Fourier transform and passes red images from one grating, blue images from another grating, and green images from the third grating. The circles designated 114.3 represent the red images which are passed from the grating oriented at $\alpha_1$. The circles designated 114.2' represent the green images which are passed from the grating oriented at $\alpha_2$. The circles designated 114.1' represent the blue images which are passed from the grating oriented at $\alpha_3$. If the zero order is passed, portions of it will be shared by each color. While in this scheme the resolution is not identical for all colors, and it is realized that the iris stop 114 could be given a complex shape and spectral transmission to compensate for this, it is not necessary to do so.

A second transform lens 155, of focal length $f_3$, is located with the transform plane 140 in front of it, and a final image and/or film plane 160 in back of it. This latter plane is located by a pair of lines 161 and 162 crossing on the system axis.

The plane 160' located by dashed lines 161' and 162' crossing on the system axis is the plane where the image ($I'(z)$) would be if the second transform lens 155 were not present. This plane 160' is located a distance $q'_2$ from the first transform lens 135, while the image plane 120 is located a distance $p'_2$ in front of that lens. Plane 160' is located a distance $p_3$ in "-front" of the second transform lens 155, while the final image plane 160 is located a distance $q_3$ in back of that lens. The iris stop 114 is located a distance $p_2$ in front of the first transform lens 135, and the transform plane 140 is located a distance $q_2$ in back of that lens. The image ($I(z)$) in the final image plane 160 may be described as:

$$I(\underline{z}) = I_R(\underline{z}) \cdot P'(\underline{z})|_{\alpha_1} + I_G(\underline{z}) \cdot P'(\underline{z})|_{\alpha_2} + I_B(\underline{z}) \cdot P'(\underline{z})|_{\alpha_3}$$

(Relation 8)

where the $P'(z)$ components are modified forms of the cosine fringes ($P(Y)$), and the zonal components $I_R(z)$, $I_G(z)$ and $I_B(z)$ form the image $$I(y) = I_R(y) + I_G(y) + I_B(y) \quad \text{(Relation 9)}$$

As has already been described, color-coded images in the form of Relation 8 can be stored in a colorblind photostorage medium, from which, by spatial filtering with polychromatic light and spectral filtering with a filter similar, for example, to filter 68 (see FIGS. 8 and 8A), the individual spectral zones can be recombined to form a full color image of the original object. Thus, by merely placing a suitable black-and-white photostorage medium (not shown) in the film plane 160, and suitably exposing it and developing it, a color-coded black-and-white stored image having the same properties as that represented in FIG. 3 is subsequently obtained in a camera system according to FIG. 9A.

The system of FIGS. 9—11 has several advantages, and unique properties. It will be observed, first, that the special grating 130 is a black-and-white grating contracted in a single layer of photographic material. Color coding is not introduced until after this grating has been convolved with the image. The color coding spectral filter 150 is physically easier to construct than a multicolor grating. Since delta functions appear in the transform plane, it is possible to use several gratings oriented closer together than $\pi/3$, so that the achievable number of zones is greater than three. The purity of spectral zone separation is not restricted to any particular color scheme and, indeed, it is envisioned that different narrow color zones within a small segment of the spectrum can be separately coded and viewed or recorded. Thus, if for research purposes one desires to investigate a narrow spectral zone, or even a line, within the blue or the red region for example, this narrow zone or line can be coded with any desired color and later viewed or recorded as represented by that coding color. This provides a useful application for the invention in the study of an aurora, for example.

In a practical example which has been constructed according to FIGS. 9A, 10 and 11, the spectral filter 150 was made for the conventional tricolor zones (red, green and blue) using Wratten filters 025, 058 and 047, respectively, with azimuthal characteristics $\alpha_1$, $\alpha_2$ and $\alpha_3$, respectively. Neutral density filters were also introduced along with the color filters, to balance the exposure, to equalize the effects of:

a. spectral output of the illuminating source;
b. spectral transmission of the colored absorption filters; and
c. spectral response of the recording emulsion.

In the case of a tungsten source with Panatomic-X film, these N.D. filters are:

Red ———N.D.=0.50 with 025 Wratten
Green ———N.D.=0.40 with 058 Wratten
Blue ———N.D.=0.00 with 047 Wratten The DC spot 145 can be blocked, but, if it is not, the spectral filter 150 is more efficient, reducing the required exposure time for making the stored image and reducing the film resolution requirements on the photostorage medium.

Figure 9B:
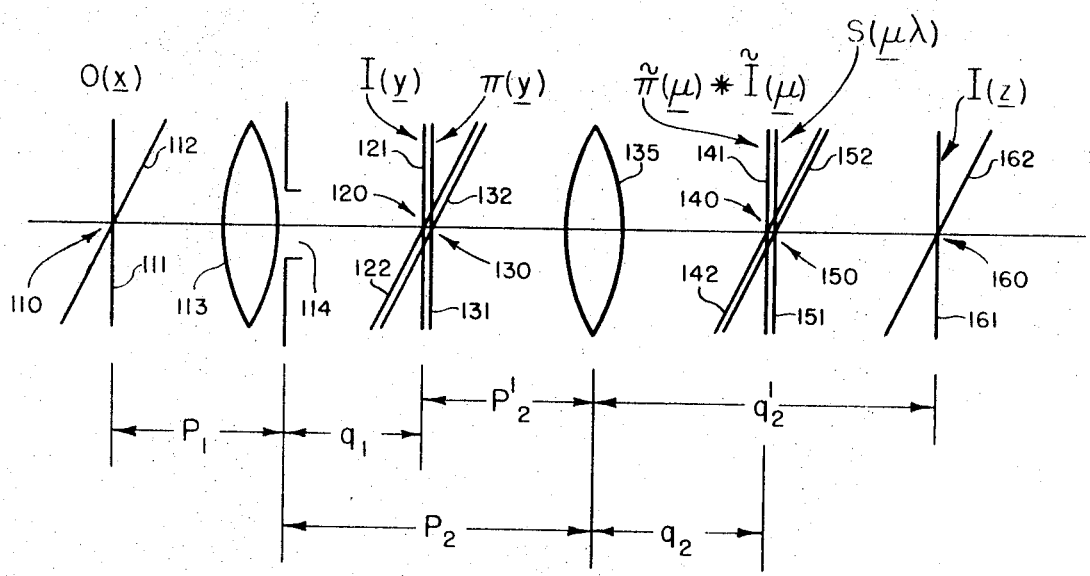

FIG. 9B shows another system which will accomplish the same purpose as the system of FIG. 9A. Similar parts of both figures have the same reference characters. FIG. 9B omits the second transform lens 155 of FIG. 9A, and the optical relationship $p'_2$ and $q'_2$ are altered. The optical distances $p_1$ and $q_1$, and $p_2$ and $q_2$, are similar in both figures.

If the "negative" color filter of FIG. 4A is substituted in FIG. 9B (for example) for the special filter 130, then the spectral filter 150 can be eliminated, and the lens 135 can be used as a relay lens to reimage the product of the image $I(y)$ and the filter $\pi(y, \lambda)$ onto a photostorage material located in the $I(z)$ plane 160. This arrangement removes problems (if any) which may be associated with maintaining the grating in contact with the photostorage material.

The foregoing description of certain embodiments of the invention is by way of example only, and not intended to limit the scope of the appended claims. Thus, for example, while transmission gratings have been illustrated as devices for modulating light with a periodic function, it will be understood that light modulation by reflection is included within the scope of the invention. No attempt has been made to illustrate all possible embodiments of the invention, but rather only to illustrate its principles and the best manner presently known to practice it. Therefore, such other forms of the invention as may occur to one skilled in this art on a reading of the foregoing specification are also within the spirit and scope of the invention, and it is intended that this invention includes all modifications and equivalents which fall within the scope of the appended claims.

I claim:

1. Method of preparing a photostored record of a scene in a photostorage material which has response to light in a prescribed spectral band but does not make a color record within said band of the recorded light, which record is suitable for producing by Fourier transform and spatial and spectral filtering techniques an image of said scene in prescribed colors which may be natural or artificial, which record is made from "$n$" light components representing spectral zones within said band of said scene where "$n$" is an integer greater than one, said method comprising the steps of:
   1. erecting in an image plane an image of said scene;
   2. modulating the light of said image in each of said components with a periodic function having a unique azimuthal orientation;
   3. selecting a modulating spatial frequency for each of said light components which is substantially twice the highest scene spatial frequency desired to be reconstructed from that component; and
   4. forming in said photostorage material from the light of said image as so modulated a photostored record of the sum of the products of said light components each multiplied with its respective modulation.

2. Method according to claim 1 in which each of said periodic functions is contained in a transmission grating which is located between said scene and said photostorage material.

3. Method according to claim 2 in which said grating is located substantially in the image plane.

4. Method according to claim 3 in which the photostorage material is also located in the image plane, the grating is in contact with the photostorage material, and the image is projected onto the photostorage material through the grating.

5. Method according to claim 3 in which a transform of the grating convolved with the image spectrum is spectrally filtered to form said photostored record.

6. Method according to claim 3 in which each periodic function is a simple noncolor selective harmonic function, and a transform of the grating convolved with the image spectrum is spectrally filtered to form said photostored record.

7. Method according to claim 2 in which the grating is a substantially two-dimensional light filter having a plurality of "$n$" periodic functions each extending throughout the area of said filter and having a unique azimuthal characteristic in the area of the filter for passing light representative of a unique wavelength band corresponding to a selected one of said spectral zones, respectively, said functions overlapping each other, the configuration of said functions being such that the light transmittance of said filter is expressed as the product:

$$\pi(\underline{x}, \lambda) = P_{\lambda_1}(\underline{x})|_{\alpha_1} \cdot P_{\lambda_2}(\underline{x})|_{\alpha_2} - - - P_{\lambda_n}(\underline{x})|_{\alpha_n}$$

Where:

$\pi(x,)$ is the mathematical representation of the total filter with transmittance a function of spatial coordinates $x$ and wavelength $\lambda$;

$P_{\bar{\lambda}_i}(\underline{x})|_{\alpha_i}$ is the periodic function corresponding to the wavelength band $\bar{\lambda}_i$ with azimuthal characteristic $\lambda_i$; and $\bar{\lambda}_i$ is the average wavelength in the band from $\bar{\lambda}_i - \Delta\lambda_i$ to $\bar{\lambda}_i + \Delta\lambda_i$.

8. Method of preparing a colorblind image transparency suitable for producing a projected image of a scene in prescribed colors, which may be natural or artificial, from "$n$" light components representing spectral zones of light from said scene where "$n$" is an integer greater than one, comprising the steps of providing a film plane contact color modulation filter having a plurality of "$n$" unique periodic functions, each of said functions having a unique azimuthal characteristic in the plane of the filter and comprised of periodic color filter elements capable of passing light limited to a unique wavelength band corresponding to a selected one of said light components, respectively, the configuration of said functions being such that when the filter is transilluminated with an aerial color image of said scene the filter-color image product is expressed as:

$$I_w(\underline{x}, \lambda) \cdot \pi(\underline{x}, \lambda) = I_{\bar{\lambda}_1}(\underline{x}) \cdot P_{\bar{\lambda}_1}(x)_{\alpha_1} + I_{\bar{\lambda}_2}(\underline{x}) \cdot P_{\bar{\lambda}_2}(x)_{\alpha_2} - - - I_{\bar{\lambda}_n}(\underline{x}) P_{\bar{\lambda}_n}(x)_{\alpha_n}$$

where
the aerial color image $I_w(x, \lambda)$ can be expressed as the sum of its spectral components:

$$I_w(\underline{x}, \lambda) = I_{\bar{\lambda}_1}(\underline{x}) + I_{\bar{\lambda}_2}(\underline{x}) + - - - I_{\bar{\lambda}_n}(\underline{x})$$

selecting a spatial frequency for each of said periodic functions which is substantially twice the highest scene spatial frequency desired to be reconstructed from the light component modulated by that periodic function; and placing said filter in contact with a photographic film which has panchromatic response to colored light but does not make a color record thereof; exposing said film to said image through said filter; and developing said film.

9. Method according to claim 8 in which said film is processed to provide a transparency in which the amplitude transmittance is substantially linearly proportional to the exposure.

10. A method according to claim 1 in which the photostored record is a transparency, including the further step of so forming said transparency that when it is transilluminated its output amplitude transmittance is substantially linearly proportional to the input exposure which formed said record.

11. A method according to claim 3 in which the image-grating product is reimaged onto said photostorage material to form said photostored record.

12. A method of spectral zonal photography comprising:
exposing a photosensitive material responsive to radiation in all spectral zones desired to be recorded to an additive superposition of spectral separation images formed in radiation propagating from a photographed scene in at least three different zones of the electromagnetic spectrum;

during the said exposure operation, causing a periodic grating function to be multiplied with each of said separation images, said grating functions having a different azimuthal orientation for each image;

selecting a spatial frequency for each of said grating functions which is substantially twice the highest scene spatial frequency desired to be reconstructed from the spectral separation image multiplied with that grating function; and developing the exposed photosensitive material to form a record containing said separation images respectively modulating azimuthally distinct spatial carriers.

13. A method as defined by claim 12 wherein said record comprises a photographic transparency and wherein said developing operation is such as to cause said transparency to have an amplitude transmittance characteristic which is substantially linearly proportional to the exposure which it received from the radiation forming said images.

14. A method as defined by claim 12 wherein said periodic arrays of filter elements are each spaced by substantially spectrally neutral elements, said filter elements in each array constituting a significantly greater fraction of the period width than said neutral elements.

15. A method of spectral zonal photography, comprising:
exposing a photosensitive material responsive to radiation in all spectral zones desired to be recorded to a scene image multiplied with a spectral zonal encoder comprising at least three mutually coextensive, azimuthally distinct periodic arrays of filter elements each having a preferential absorption for a different spectral zone and thus each modulating a different color separation image;

selecting a spatial frequency for each of said periodic arrays of filter elements which is substantially twice the highest scene spatial frequency desired to be reconstructed from the color separation image modulated by that array; and developing the exposed photosensitive material to form a record containing said color separation images respectively modulating azimuthally distinct spatial carriers.

16. A method of color photography using monochrome or other recording materials which do not exhibit, when developed, recorded color values in color, comprising:
exposing a photosensitive material responsive to radiation in all spectral zones desired to be recorded to a scene multiplied with a spectral zonal filter comprising mutually coextensive, azimuthally distinct periodic arrays of cyan, yellow, and magenta filter elements, said cyan, yellow, and magenta arrays respectively periodically modulating red, blue, and green color separation images;

selecting a spatial frequency for each of said periodic arrays of filter elements which is substantially twice the highest scene spatial frequency desired to be reconstructed from the color separation image modulated by that array; and developing said photosensitive material to form a record containing red, blue, and green color separation images respectively modulating azimuthally distinct spatial carriers.

17. A method as defined by claim 16 wherein said record comprises a photographic transparency and wherein said developing operation is such as to cause said transparency to have an amplitude transmittance characteristic which is substantially linearly proportional to the exposure which it received from the radiation forming said images.

18. A method as defined by claim 16 wherein said periodic arrays of filter elements are each spaced by substantially spectrally neutral elements, said filter elements in each array constituting a significantly greater fraction of the period width than said neutral elements.

19. A method of spectral zonal photography and reconstruction, comprising:
exposing a photosensitive material to a scene multiplied with a spectral zonal filter comprising three mutually coextensive, azimuthally distinct periodic arrays of filter elements each having a preferential absorption for a different spectral zone and thus each modulating a different spectral separation image;

selecting a spatial frequency for each of said periodic arrays of filter elements which is substantially twice the highest scene spatial frequency desired to be reconstructed from the spectral separation image modulated by that array;

developing said photosensitive material to form a record containing three spectral separation images modulating azimuthally distinct spatial carriers;

locating the developed record in a beam of light which is substantially coherent;

forming in a Fourier transform space a diffraction pattern of said record including three angularly separated Dirac delta function arrays, each array being convolved with a spectrum of spatial frequencies characterizing a different one of said color separation images;

selectively transmitting through said Fourier transform space at least one spectral order of said spatial frequency spectra associated with each of said color separation images;

causing the radiation passed through said transform space in each of said spectral orders to have a mean wavelength consonant with the color separation information carried; and retransforming said transmitted spectra to thus produce at an output plane a full spectrum aerial reconstruction of the photographed scene.

20. A method as defined by claim 19 wherein said record comprises a photographic transparency and wherein said developing operation is such as to cause said transparency to have an amplitude transmittance characteristic which is substantially linearly proportional to the exposure which it received from the radiation forming said images.

21. A method as defined by claim 19 wherein said periodic arrays of filter elements are each spaced by substantially spectrally neutral elements, said filter elements in each array constituting a significantly greater fraction of the period width than said neutral elements.

22. A method of color photography and reconstruction using monochrome or other recording materials which do not exhibit, when developed, recorded color values in color, comprising:

erecting a full color aerial image of a scene to be photographed at an image plane;

locating a color encoding filter at said image plane so as to be multiplied with said scene image, said filter comprising three mutually coextensive, azimuthally separated periodic arrays of different subtractive primary filter elements, each periodic array modulating a different color separation image;

selecting a spatial frequency for each of said periodic arrays of filter elements which is substantially twice the highest scene spatial frequency desired to be reconstructed from the color separation image modulated by that array;

exposing a photosensitive material to said image multiplied with said filter;

developing said material to form a record of said scene in which red, blue, and green color separation images are effectively impressed on spatial carriers having different azimuthal orientations;

locating the developed record in light which is substantially coherent;

forming in a Fourier transform space at least one diffraction pattern of said record including three angularly separated Dirac delta function arrays respectively convolved with spectra of said red, blue, and green color separation images;

selectively transmitting at least one spectral order of each of said arrays through said Fourier transform space; and causing the light carrying said red, blue, and green color separation information to be predominantly red, blue, and green, respectively, whereby a full color aerial reconstruction of said scene is produced.

23. A method of color photography for recording color scenes on monochrome or other recording materials which do not exhibit, when developed, recorded color values in color, comprising:

locating at a recording plane a photosensitive material responsive to radiation in all spectral zones desired to be recorded;

effecting a multiple exposure of said photosensitive material by, in succession, forming an image of said photographic object on said photosensitive material in radiation in each of a plurality of spectral zones to which said photosensitive material is responsive;

during each of said multiple exposures of said photosensitive material, locating at said recording plane a grating having a spatial frequency resolvable by said photosensitive material;

selecting a spatial frequency for the grating for each exposure which is substantially twice the highest scene spatial frequency desired to be reconstructed from the color separation image modulated by that grating;

causing the grating to have a different relative azimuthal orientation during each exposure of said photosensitive material; and developing the multiple latent color separation images thus formed in said photosensitive material to produce a record containing a plurality of additively superimposed color separation images each of which modulates a spatial carrier having a different azimuthal orientation.

24. A method as defined by claim 23 wherein said record comprises a photographic transparency and wherein said development step is such as to cause said transparency to have an amplitude transmittance characteristic which is substantially linearly proportional to the exposure which it received from the radiation forming said images.

25. A method as defined by claim 23 wherein said grating comprises a periodic array of alternately opaque and neutral areas, the opaque area constituting a significantly greater fraction of the period width than said neutral areas.

26. A method of color photography and reconstruction using monochrome or other recording materials which do not exhibit, when developed, recorded color values in color, comprising:

locating at a recording plane a photosensitive material responsive to radiation in all spectral zones desired to be recorded;

effecting a multiple exposure of said photosensitive material by, in succession, forming an image of said photographic object on said photosensitive material in radiation in each of a plurality of spectral zones to which said photosensitive material is responsive;

during each of said multiple exposures of said photosensitive material, locating at said recording plane a grating having a spatial frequency resolvable by said photosensitive material;

selecting a spatial frequency for the grating for each exposure which is substantially twice the highest scene spatial frequency desire to be reconstructed from the color separation image modulated by that grating;

causing the grating to have a different relative azimuthal orientation during each exposure of said photosensitive material;

locating the developed record in a beam of light which is substantially coherent;

forming in a Fourier transform space a diffraction pattern of said record including three angularly separated Dirac delta function arrays, each array being convolved with a spectrum of spatial frequencies characterizing a different one of said color separation images;

selectively transmitting through said Fourier transform space at least one spectral order of said spatial frequency spectra associated with each of said color separation images;

retransforming said transmitted spectra;

causing the radiation passed through said transform space in each of said spectral orders to have a mean wavelength consonant with the color separation information carried; and retransforming said transmitted spectra to erect at an output plane a full color aerial reconstruction of the photographed scene.

27. A method as defined by claim 26 wherein said record comprises a photographic transparency and wherein said development step is such as to cause said transparency to have an amplitude transmittance characteristic which is substantially linearly proportional to the exposure which it received from the radiation forming said images.

28. A method as defined by claim 26 wherein said grating comprises a periodic array of alternately opaque and neutral areas, the opaque area constituting a significantly greater fraction of the period width than said neutral areas.

29. A method of spectral zonal photography for recording color values on monochrome or other recording materials which do not exhibit, when developed, recorded color values in color, comprising:

erecting a full-color aerial image of a scene to be photographed at a first image plane;

locating a grating at said first image plane so as to be multiplied with said scene image, said grating comprising a plurality of mutually coextensive azimuthally separated periodic arrays of alternately opaque and neutral areas, said grating acting as a beam splitter to produce distinct diffraction distributions along the direction vectors of each of said azimuthally separated periodic arrays to form a radial spokelike composite diffraction distribution;

locating spectral filters having passbands characterizing different spectral zones over the diffraction distributions associated with each of said periodic arrays;

collecting light passed by said spectral filters and forming at a second image plane a second image of said scene, representing the distribution at said first image plane as modified by said grating and said spectral filters; and recording said second image on a photosensitive material located at said second image plane, the record thus formed comprising an additive superposition of color separation images defined by said spectral passbands of said spectral filters, said color separation images respectively modulating spatial carriers at different azimuthal orientations corresponding to the azimuthal orientations of said periodic arrays in said grating.

30. A method of color photography for recording color scenes on monochrome or other recording materials which do not exhibit, when developed, recorded color values in color, comprising:

erecting an aerial image of a scene to be photographed at a first image plane;

locating a grating at said first image plane so as to be multiplied with said scene image, said grating comprising three mutually coextensive azimuthally separated periodic arrays of alternately opaque and neutral areas, said grating acting as a beam splitter to produce three distinct diffraction distributions along the direction vectors of each of said azimuthally separated periodic arrays to form a radial spokelike composite diffraction distribution;

locating red, blue, and green spectral filters respectively over said three diffraction distributions associated with said three periodic arrays;

collecting light passed by said spectral filters and forming at a second image plane a second image of said scene, representing the distribution at said first image plane as modified by said grating and said spectral filters;

recording said second image on a photosensitive material located at said second image plane, the record thus formed comprising an additive superposition of red, blue, and green color separation images defined by said spectral filters, said color separation images respectively modulating spatial carriers at different azimuthal orientations corresponding to the relative azimuthal orientations of said periodic arrays in said grating;

locating said record in a beam of substantially coherent light;

forming in a Fourier transform space at least one diffraction pattern of said record including three angularly separated Dirac delta function arrays respectively convolved with spectra of red, blue, and green color separation images;

selectively transmitting at least one spectral order of each of said arrays through said Fourier transform space; and causing the light carrying said red, blue, and green color separation information to be predominantly red, blue, and green, respectively, whereby a full color aerial reconstruction of said scene is produced.

31. A method of recording multicolor images on black-and-white silver halide photographic film by spectral zonal photography for subsequent retrieval and display of said images in color by spatial and spectral filtering, wherein the recorded image has essentially no intrinsic color other than black and white and carries color information in spatially distributed modulations of the recording image, compressing:

exposing a black-and-white substantially panchromatically sensitive photographic film simultaneously to a self-registered plurality of spectrally separated images of a multicolor scene formed in radiation propagating from said scene, said images being separated into at least three separate zones of the visible light spectrum; during said exposure operation, causing a spatially periodic light modulation function to be multiplied with each of said spectrally separated images substantially throughout said image, said light modulation functions each having a unique azimuthal orientation which characterizes the spectrally separated image modulated thereby for separation in Fourier transform space from the remainder of said images, the spatial frequency of each of said light modulation functions being substantially twice as great as the highest scene spatial frequency desired to be recorded in the image modulated thereby; and developing the thus exposed photographic film to form a composite record of said images each bearing its spatially periodic modulation having said unique azimuthal orientation.

32. A method of recording multicolor images on black-and-white silver halide photographic film by spectral zonal photography for subsequent retrieval and display of said images in color by spatial and spectral filtering, wherein the recorded image has essentially no intrinsic color other than black and white and carries color information in spatially distributed modulations of the recorded image, comprising:

exposing a black-and-white substantially panchromatically sensitive photographic film simultaneously to a self-registered plurality of spectrally separated images of a multicolor scene formed in radiation propagating from said scene, said images being separated into at least three separate zones of the visible light spectrum;

during said exposure operation, causing a spatially periodic light modulation function to be multiplied with each of said spatially separated images substantially throughout said image, said light modulation functions each having a unique azimuthal property which characterizes the spectrally separated image modulated thereby for separation in Fourier transform space from the remainder of said images, the spatial frequency of each of said light modulation functions being substantially twice as great as the highest scene spatial frequency desired to be recorded in the image modulated thereby; and developing the thus exposed photographic film to form a composite record of said images each bearing its spatially periodic modulation having said unique azimuthal property;

modulating with said record a beam of light that is substantially coherent;

forming in a Fourier transform space from said light as so modulated a diffraction pattern of said record including a plurality, the same in number as said plurality of spectrally separated images, of spatially separated Dirac delta function arrays, each array being convolved with a spectrum of spatially dispersed frequencies and characterizing a unique one of said spectrally separated images; selectively transmitting through said Fourier transform space from each of said arrays the spectral zone corresponding to the spectral zone of the spectrally separated image characterized by said array; and retransforming light of said transmitted zones to thus produce at an output space an aerial reconstruction of said multicolor scene.